(12) United States Patent
Lin et al.

(10) Patent No.: US 7,442,325 B2
(45) Date of Patent: *Oct. 28, 2008

(54) STABILIZED CROSSLINKING COMPOSITION

(75) Inventors: Lon-Tang Wilson Lin, Bethel, CT (US); William Jacobs, III, Bethel, CT (US)

(73) Assignee: Cytec Technology Corp., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/953,025

(22) Filed: Sep. 29, 2004

(65) Prior Publication Data

US 2006/0074203 A1  Apr. 6, 2006

(51) Int. Cl.
C08G 12/02 (2006.01)
C08G 12/06 (2006.01)
C08G 12/12 (2006.01)
C08G 12/38 (2006.01)
C09K 3/00 (2006.01)

(52) U.S. Cl. ............... 252/182.27; 252/186.26; 252/182.13; 252/182.34; 525/256; 525/259; 544/192

(58) Field of Classification Search ............ 252/182.27; 525/256
See application file for complete search history.

(56) References Cited

U.S. PATENT DOCUMENTS

| | | | | |
|---|---|---|---|---|
| 3,744,970 A | * | 7/1973 | Swidler et al. | ............ 8/183 |
| 3,806,508 A | | 4/1974 | Weinrotter et al. | |
| 4,064,191 A | * | 12/1977 | Parekh | ............ 525/186 |
| 4,180,488 A | | 12/1979 | Stern et al. | |
| 4,454,133 A | | 6/1984 | Berke et al. | |
| 4,540,735 A | * | 9/1985 | Borovicka, Sr. | ............ 524/512 |
| 4,789,707 A | | 12/1988 | Nishimura et al. | |
| 4,851,269 A | * | 7/1989 | Meyers et al. | .......... 427/428.01 |
| 4,968,775 A | * | 11/1990 | Toman et al. | ............ 528/272 |
| 5,276,130 A | * | 1/1994 | Bradford et al. | ............ 528/230 |
| 5,384,163 A | * | 1/1995 | Budde et al. | ............ 427/385.5 |
| 5,552,488 A | * | 9/1996 | Bradford et al. | ............ 525/163 |
| 5,798,145 A | * | 8/1998 | Barancyk et al. | ........ 427/393.5 |
| 5,807,929 A | | 9/1998 | Lin et al. | |
| 6,136,443 A | * | 10/2000 | Mauer et al. | ............ 428/413 |
| 7,034,086 B2 | * | 4/2006 | Lin et al. | ............ 525/375 |
| 2004/0043223 A1 | * | 3/2004 | Hu et al. | ............ 428/413 |

FOREIGN PATENT DOCUMENTS

| | | | |
|---|---|---|---|
| AT | 352230 | | 9/1979 |
| GB | 494700 | * | 3/1939 |
| WO | WO 96/17879 | * | 6/1996 |
| WO | WO 97/11119 | * | 3/1997 |
| WO | WO 2004/094497 A1 | | 11/2004 |
| WO | WO 2004/094498 A1 | | 11/2004 |

* cited by examiner

*Primary Examiner*—Joseph D. Anthony
(74) *Attorney, Agent, or Firm*—Todd E. Garabedian; Fran Wasserman

(57) ABSTRACT

This invention relates to a crosslinking composition comprising an organic acid and a compound having the structure of Formula I:

$$A'-NR^4-R^D$$

wherein A', $R^4$, and $R^D$ are defined in the specification. This invention also relates to a process for producing the crosslinking composition by reacting an amino compound containing amino groups; a mono(alkylaldehyde) and/or a poly(alkylaldehyde), and an alcohol; and adding an organic compound where said amino compound is selected from the group consisting of: triazine, linear or cyclic ureas, cyanuric acid, substituted cyanuric acids, linear or cyclic amides, glycolurils, hydantoins, linear or cyclic carbamates and mixtures thereof.

33 Claims, No Drawings

STABILIZED CROSSLINKING COMPOSITION

FIELD OF THE INVENTION

The invention is directed to aminoplast-based crosslinking compositions and their method of preparation. In particular, the invention relates to stabilized aminoplast-based crosslinking compositions, which are stabilized by organic acids and prepared by reacting amino compounds with mono (alkylaldehydes) and/or poly(alkylaldehydes) and alcohol.

BACKGROUND OF THE INVENTION

Traditional industrial coatings have for years been based in significant part on backbone resins having active hydrogen groups crosslinked with various derivatives of amino-1,3,5-triazines. Most notable among the amino-1,3,5-triazine derivatives are the aminoplasts such as the alkoxymethyl derivatives of melamine and guanamines which, while providing excellent results in a number of aspects, have the disadvantage of releasing formaldehyde as a volatile by-product under curing conditions and requiring relatively high temperatures to adequately crosslink the film.

Despite the excellent film coating properties, which can be achieved with aminoplast crosslinked systems, the coatings industry is under great pressure to reduce the environmentally undesirable emission of formaldehyde. In addition, high temperature crosslinking systems require more energy to cure and/or crosslink slower resulting in less throughput. As a result, it has long been a desire of industry to find acceptable alternative crosslinkers and coatings systems, which emit no formaldehyde, or low amounts of formaldehyde, are soluble and/or stable in common solvents used in the coating industry and cure at relatively lower temperatures.

U.S. Pat. Nos. 3,806,508 and 4,180,488 disclose the preparation of resins prepared by reacting melamine with a mono (alkylaldehyde) and an alcohol. However, neither patent discloses nor teaches the use of organic acids to stabilize the resin composition.

U.S. Pat. No. 4,454,133 discloses the preparation of antimicrobial compounds prepared by reacting an amide or imide compound with poly(alkylaldehydes), e.g., glutaraldehyde. However, the patent neither discloses nor teaches reacting an amino-based compound with mono(alkylaldehydes) and/or poly(alkylaldehydes) and alcohol to form a crosslinking composition, nor discloses the use of organic acids to stabilize the composition.

SUMMARY OF THE INVENTION

This invention relates to a stabilized crosslinking composition comprising an organic acid and a compound having the structure of Formula I:

A'-NR$^A$—R$^D$  Formula I where A' is a moiety derived from the group consisting of triazines, linear or cyclic ureas, cyanuric acid, substituted cyanuric acids, linear or cyclic amides, glycolurils, hydantoins, linear or cyclic carbamates and mixtures thereof, or a moiety comprising the structure:

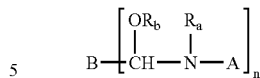

where R$^A$ is R$^D$, hydrogen, an alkyl of 1 to 20 carbon atoms, or taken together with A' forms a cyclic compound;

R$^D$ is —CHR$^C$OR$^B$, wherein R$^B$ is hydrogen, alkyl, aryl, aralkyl or an alkaryl having from 1 to about 24 carbon atoms and R$^C$ is an alkyl, halogenated alkyl, aryl, aralkyl, halogenated aralkyl, alkoxyalkyl or an alkaryl having from 1 to about 24 carbon atoms;

A is a moiety derived from the group consisting of linear or cyclic ureas, cyanuric acid, substituted cyanuric acids, linear or cyclic amides, glycolurils, hydantoins, linear or cyclic carbamates and mixtures thereof;

B is a residue of a poly(alkylaldehyde) with n aldehyde groups;

n is an integer of 2 to about 8;

R$_a$ is R$_d$, hydrogen, an alkyl of 1 to about 20 carbon atoms, or taken together with A forms a cyclic compound;

where R$_d$ is CHR$_c$OR$_b$ or

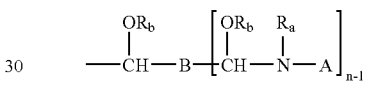

where R$_b$ is hydrogen, alkyl, aryl, aralkyl or an alkaryl having from 1 to about 24 carbon atoms and R$_c$ is an alkyl, halogenated alkyl, aryl, aralkyl, halogenated aralkyl, alkoxyalkyl or an alkaryl having from 1 to about 24 carbon atoms; and where the alkyl or aryl groups in each radical may optionally have heteroatoms in their structure.

This invention also relates to a process for producing the stabilized crosslinking composition by reacting an amino compound containing amino groups; a mono(alkylaldehyde) and/or a poly(alkylaldehyde), and an alcohol; and stabilizing the composition by adding an organic acid before, during and/or after the reaction where said amino compound is selected from the group consisting of: triazines, linear or cyclic ureas, cyanuric acid, substituted cyanuric acids, linear or cyclic amides, glycolurils, hydantoins, linear or cyclic carbamates and mixtures thereof.

DETAILED DESCRIPTION OF THE INVENTION

In the present invention, the term "mono(alkylaldehyde)" is an aldehyde having the general formula: R$_2$—CHO, where R$_2$ is alkyl, halogenated alkyl, aryl, aralkyl, halogenated aralkyl, alkoxyalkyl or an alkaryl, having from 1 to about 24 carbon atoms or about 1 to 12 carbon atoms or about 1 to 4 carbon atoms.

The term "poly(alkylaldehyde)" is an aldehyde having the general formula: B—[—CHO]$_n$, where B is a organic residue of a poly(alkylaldehyde) with n aldehyde groups and n is an integer of 2 to about 8. A non-limiting example of a poly (alkylaldehyde) is glutaraldehyde having the structure OHC—(CH$_2$)$_3$—CHO, where B is —(CH$_2$)$_3$— and n is equal to 2.

The term "and/or" means either or both. For example, "A and/or B" means A or B, or both A and B.

The term "hydrocarbyl," as used herein, is a monovalent hydrocarbon group in which the valency is derived by extraction of a hydrogen from a carbon. Hydrocarbyl includes, for example, aliphatics (straight and branched chain), cycloaliphatics, aromatics and mixed character groups (e.g., aralkyl and alkaryl). Hydrocarbyl also includes groups with internal unsaturation and activated unsaturation. More specifically, hydrocarbyl includes, but is not limited to: alkyl, cycloalkyl, aryl, aralkyl, alkaryl, alkenyl, cycloalkenyl, and alkynyl, typically having from 1 to about 24 carbon atoms, preferably having from 1 to about 12 carbon atoms or 1 to about 4 carbon atoms. A hydrocarbyl may contain one or more carbonyl groups (which is/are included in the carbon count) and/or a heteroatom or heteroatoms (such as at least one oxygen, nitrogen, sulfur, or silicon) in the chain or ring. In addition, a hydrocarbyl may have one or more of the hydrogens of the hydrocarbon group replaced by a functional group commonly found in organic molecules. The phrase "functional group commonly found in organic molecules" means non-hydrocarbyl groups that are typically found in organic molecules including, but not limited to, halides, cyano groups, amino groups, thiol groups, carboxylate groups, hydroxyl groups, sulfonate groups, nitroso groups, nitro groups, and the like.

This invention relates to a stabilized crosslinking composition comprising an organic acid and a compound having the structure of Formula I:

$$A'-NR^A-R^D \qquad \text{Formula I}$$

where A' is a moiety derived from the group consisting of triazines, linear or cyclic ureas, cyanuric acid, substituted cyanuric acids, linear or cyclic amides, glycolurils, hydantoins, linear or cyclic carbamates and mixtures thereof, or a moiety comprising the structure:

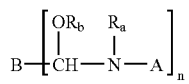

where $R^A$ is $R^D$, hydrogen, an alkyl of 1 to 20 carbon atoms, or taken together with A' forms a cyclic compound;

$R^D$ is —$CHR^C OR^B$, where $R^B$ is hydrogen, alkyl, aryl, aralkyl or an alkaryl having from 1 to about 24 carbon atoms and $R^C$ is an alkyl, halogenated alkyl, aryl, aralkyl, halogenated aralkyl, alkoxyalkyl or an alkaryl having from 1 to about 24 carbon atoms;

A is a moiety derived from the group consisting of linear or cyclic ureas, cyanuric acid, substituted cyanuric acids, linear or cyclic amides, glycolurils, hydantoins, linear or cyclic carbamates and mixtures thereof;

B is a residue of a poly(alkylaldehyde) with n aldehyde groups;

n is an integer of 2 to about 8;

$R_a$ is $R_d$, hydrogen, an alkyl of 1 to about 20 carbon atoms, or taken together with A forms a cyclic compound;

where $R_d$ is $CHR_c OR_b$ or

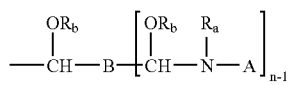

where $R_b$ is hydrogen, alkyl, aryl, aralkyl or an alkaryl having from 1 to about 24 carbon atoms and $R_c$ is an alkyl, halogenated aryl, aralkyl, halogenated aralkyl, alkoxyalkyl or an alkaryl having from 1 to about 24 carbon atoms; and wherein the alkyl or aryl groups in each radical may optionally have heteroatoms in their structure. The amount of organic acid that may be used to stabilize the crosslinking composition ranges from a low of about 1:50, or about 1:20 or about 1:10 or about 1:5 or about 1:2.5 moles of organic acid to moles of amino compound used to derive the A' or A moieties to a high of about 1:2, or about 1:1, or about 1.5:1 or about 2:1 or about 4:1 or about 10:1, or about 20:1 or about 50:1 moles of organic acid to moles of amino compound used to derive the A' or A moieties.

This invention also relates to a process for producing the crosslinking composition by reacting an amino compound containing amino groups; a mono(alkylaldehyde) and/or a poly(alkylaldehyde), and an alcohol; and stabilizing the composition by adding an organic acid before, during and/or after the reaction; where said amino compound is selected from the group consisting of: triazines, linear or cyclic ureas, cyanuric acid, substituted cyanuric acids, linear or cyclic amides, glycolurils, hydantoins, linear or cyclic carbamates and mixtures thereof. The above reaction may be prepared in an one-step or multi-step process. Preferably, the reaction is carried out in a multi-step process where the amino compound is first reacted with the mono and/or poly(alkylaldehydes). The reaction product is then reacted with an alcohol, optionally in the presence of an acid catalyst.

As stated above, the amount of organic acid that may be used to prepare the stabilized crosslinking composition ranges from a low of about 1:50, or about 1:20 or about 1:10 or about 1:5 or about 1:2.5 moles of organic acid to moles of amino compound to about 1:2, or about 1:1, or about 1.5:1 or about 2:1 or about 4:1 or about 10:1 or about 20:1 or about 50:1 moles of organic acid to moles of amino compound.

Generally, one —NH group from the amino compound reacts with an aldehyde group in the mono- or poly(alklyaldehydes) as set forth below.

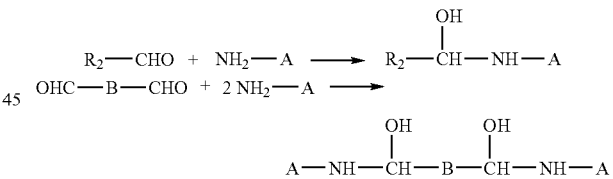

where A, B and $R_2$ are defined above.

During the etherification reaction, the hydroxyl groups may be etherified by the reacting alcohol ($R_1$—OH)

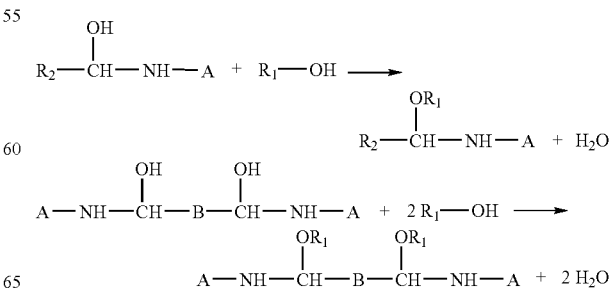

It should be noted that A and/or A' may be a monovalent or divalent radical depending on whether the amino group is linear or forms part of a cyclic ring respectively.

The table below illustrates the numerous and diverse amino compounds that may be used in this invention.

Linear Amino Compounds

| Name | Formula | A' or A moiety |
|---|---|---|
| Amides | R—C(=O)—NHR' | R—C(=O)— |
| Ureas | RHN—C(=O)—NHR' | RHN—C(=O)— |
| Carbamates | R—O—C(=O)—NHR' | R—O—C(=O)— |
| Triazines | triazine with R', R', R'' substituents | triazine with R', R', R'' substituents |

Cyclic Amino Compounds

| Name | Formula | A' or A moiety |
|---|---|---|
| Hydantoins | hydantoin with R'N, NR, R, R substituents | hydantoin A moiety |
| Glycolurils | glycoluril with R substituents | glycoluril A moiety |
| Cyanuric Acids | cyanuric acid with RN, NR, R substituents | cyanuric acid A moiety | where R' and R are hydrogen or a hydrocarbyl group and R'' is hydrogen, hydrocarbyl or —NR$_2$. It should be noted that the disclosure of the above compounds are for illustrative purposes only, and should not be construed as limiting the scope of the present invention.

Non-limiting examples of amide compounds that may be used are acrylamide adipamide, p-toluenesulfonamide, methyl acrylamide and the like.

Examples of urea compounds that may be used in the present invention, include but are not limited to: urea, ethylene urea, dihydroxyethylene urea, dimethylurea and the like.

Non-limiting examples of carbamate compounds that may be used are methyl carbamate, ethyl carbamate, butyl carbamate, trimethyolpropane-triscarbamate, butane diol dicarbamate and the like.

Examples of triazine compounds that may be used in the present invention, include but are not limited to melamine, benzoguanamine, acetoguanamine, cyclohexylguanamine, di- or tri-alkylmelamines and the like.

Non-limiting examples of hydantoin compounds that may be used are hydantoin, methyl hydantoin, ethyl hydantoin, propyl hydantoin, butyl hydantoin and other substituted hydantoins.

Examples of glycoluril compounds that may be used in the present invention, include but are not limited to glycoluril, methyl glycoluril, ethyl glycoluril and other substituted glycolurils.

Non-limiting examples of cyanuric acid compounds that may be used are cyanuric acid, methyl cyanuric acid, ethyl cyanuric acid and other substituted cyanuric acids.

It should also be noted that more than one poly(alkylaldehyde) could react with an amino compound resulting in an oligomer. The term "oligomer" in this application means a compound having 2 or more amino compound repeating units. Preferably, the oligomer has a number average molecular weight of from about 200 to about 5000, or about 600 to about 3000, or about 600 to about 2000.

Preferably, in the above Formula I; B is methylene, ethylene, propylene or a structure of the formula:

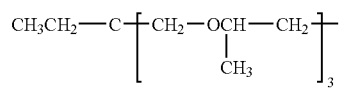

which is the 1,4 Michael addition of crotonaldehyde with trimethylolpropane. Similarly, one may use the reaction product of crotonaldehyde and polyhydritic alcohols, such as glycerol, pentaerythritol, sorbitol, 1,4-butanediol, sugars, starches, cellulose and the like; or adducts and polymers of α,β-unsaturated aldehydes.

Also, preferred is when $R_c$ and $R^C$ are $C_1$ to $C_8$ alkyl, $R_b$ and $R^B$ are $C_1$ to $C_8$ alkyl or $C_1$ to $C_8$ alkoxyalkyl and A and A' are moieties derived from urea, glycoluril or mixtures thereof. Also preferred is when $R_b$ and $R^B$ are independently derived from methanol, ethanol, propanol, isopropanol, butanol, isobutanol, cyclohexanol, phenol, benzyl alcohol, monoalkyl ether of ethylene or propylene glycol and mixtures thereof.

In addition, it is also preferred that about 10% to about 90% of the $R^D$ and $R_d$ groups, or about 15% to about 70%, or about 30% to about 50% of the $R^D$ and $R_d$ groups on a molar basis are —$CHR^COR^B$ and —$CHR_cOR_b$, respectively.

In another embodiment of the present invention, the stabilized crosslinking composition comprises an organic acid and the structure of Formula I:

wherein A' is a moiety derived from triazines, linear or cyclic ureas, cyanuric acid, substituted cyanuric acids, linear or cyclic amides, glycolurils, hydantoins, linear or cyclic carbamates and mixtures thereof: wherein $R^A$ is $R^D$, hydrogen, an alkyl of 1 to about 20 carbon atoms, or taken together with A' forms a cyclic compound; $R^D$ is —$CHR^COR^B$, wherein $R^B$ is hydrogen, alkyl, aryl, aralkyl, or an alkaryl having from 1 to about 24 carbon atoms and $R^C$ is an alkyl, halogenated alkyl, aryl, aralkyl, halogenated aralkyl, alkoxyalkyl or an alkaryl having from 1 to about 24 carbon atoms. Preferably, in this embodiment, the amino compound is melamine, guanamine, linear or cyclic ureas or mixtures thereof. Also, preferred is when $R^C$ is a $C_1$ to $C_8$ alkyl, $R^B$ is a $C_1$ to $C_8$ alkyl or $C_1$ to $C_8$ alkoxyalkyl. Also preferred is when $R^B$ is independently derived from methanol, ethanol, propanol, isopropanol, butanol, isobutanol, cyclohexanol, phenol, benzyl alcohol, monoalkyl ether of ethylene or propylene glycol and mixtures thereof.

In addition, it is also preferred that about 10% to about 90% of the $R^D$ groups, or about 15% to about 70%, or about 30% to about 50% of the $R^D$ groups on a molar basis are —$CHR^COR^B$.

This invention also relates to a process for producing a stabilized crosslinking composition comprising reacting an amino compound containing amino groups; a mono(alkylaldehyde) and/or a poly(alkylaldehyde); and an alcohol; and stabilizing the composition by adding an organic acid before, during and/or after the reaction; where said amino compound is selected from the group consisting of: triazines, linear or cyclic ureas, cyanuric acid, substituted cyanuric acids, linear or cyclic amides, glycolurils, hydantoins, linear or cyclic carbamates and mixtures thereof.

Another embodiment of this invention is a process for producing a stabilizing crosslinking composition comprising reacting an amino compound containing amino groups; a mono(alkylaldehyde); and an alcohol; and stabilizing the composition by adding an organic acid before, during and/or after the reaction; wherein said amino compound is selected from the group consisting of triazines, linear or cyclic ureas, cyanuric acid, substituted cyanuric acids, linear or cyclic amides, glycolurils, hydantoins, linear or cyclic carbamates and mixtures thereof.

The organic acids that may be used in this invention to stabilize the crosslinking compositions include, but are not limited to organic compounds that contain at least one acidic functional group including $RCO_2H$, $R_xSO_3H$, $R_xSO_2H$, $R_yOH$, $R_xPO_3H$ and $R_xPO_2H$, wherein R is hydrogen or a hydrocarbyl, $R_x$ is hydrocarbyl and $R_y$ is aryl. Examples of organic acids that may be used, include but are not limited to, acetic acid, (including glacial acetic acid and mono or polyhalogenated acetic acids), formic acid, propionic acid, butanoic acid, pentanoic acid, hexanoic acid, benzoic acid, phthalic acid, carbonic acid, oxalic acid, malonic acid, succinic acid, glutaric acid, adipic acid, malic acid, tartaric acid, citric acid, lactic acid, glycolic acid, glyoxylic acid, methanesulfonic acid, and p-toluenesulfonic acid or mixtures thereof. Preferably, the organic acid is a carboxylic acid (i.e., mono-, di-, tri- or polycarboxylic acids). Preferred carboxylic acid are acetic, formic and propionic acid.

Non-limiting examples of mono(alkylaldehyde) that may be used in this invention are acetaldehyde, propionaldehyde, n-butyraldehyde, isobutyraldehyde, valeraldehyde, chloral, caproaldehyde, octylaldehyde, acrolein and crotonaldehyde.

Examples of poly(alkylaldehyde) which made be used in this invention include, but are not limited to glutaraldehyde; the reaction product of crotonaldehyde and polyhydritic alcohols, such as glycerol, pentaerythritol, trimethylolpropane, sorbitol, 1,4-butanediol, sugars, starches, cellulose and the like; or adducts and polymers of α, β-unsaturated aldehydes.

Non-limiting examples of alcohols that may be used in this invention are methanol, ethanol, propanol, isopropanol, butanol, isobutanol, cyclohexanol, phenol, benzyl alcohol, monoalkyl ether of ethylene or propylene glycol and mixtures thereof.

In the above reactions, the molar ratio of amino groups in all amino compounds to mono(alkylaldehyde) is about 1:0.1 to about 1:30, or about 1:0.25 to about 1:10 or about 1:0.5 to about 1:5. In this application "amino groups" include groups with primary and/or secondary amines, i.e., —$NH_2$ and —NHR groups, respectively.

In addition, the molar ratio of amino groups in the amino compounds to aldehyde groups in the poly(alkylaldehyde) is about 0.1:1 to about 50:1, or about 0.5:1 to about 25:1 or about 1:1 to about 10:1.

The molar ratio of aldehyde groups in the mono(alkylaldehyde) and poly(alkylaldehyde) to alcohol is about 1:0.2 to about 1:50, or about 1:0.5 to about 1:5 or about 1:1 to about 1:3.

The amount of organic acid that may be used to stabilize the crosslinking composition ranges from a low of about 1:50, or about 1:20 or about 1:10 or about 1:5 or about 1:2.5 moles of organic acid to moles of amino compound to a high of about 1:2, or about 1:1, or about 1.5:1 or about 2:1 or about 4:1 or about 10:1 or about 20:1 or about 50:1 moles of organic acid to moles of amino compound.

It is believed that many of the amino-based crosslinking compositions derived from mono(alkylaldehydes) and/or poly(alkylaldehydes) are not very soluble and/or not stable in common solvents used in the coatings industry. Many of these amino-based compounds are not soluble or precipitate out over time leading to unstable compositions. The inventors of the present invention have discovered that the use of organic acids in these compositions better solubilizes the amino-based crosslinking compounds in the solvents leading to more stable compositions. Crosslinking solids concentration needed for coating applications is typically greater than about 20 wt. % based on the total weight of crosslinker and solvent.

It should be noted that the above amounts are a general guide and the actual amount of the ingredients will depend on the type of reactants and conditions used to produce and stabilize the crosslinking composition.

The reaction should be conducted to prevent gelation, which would have a deleterious effect on the crosslinking composition. For example, if the amino compounds contain a large number of amino groups, then a relative small amount of polyfunctional poly(alkylaldehydes) should be used in order to end-cap with amino groups to prevent an insoluble crosslinked gel from forming. Conversely, one can charge a large excess of poly(alkylaldehydes) to effectively end-cap with aldehydes in order to prevent gelation. In addition, higher reaction temperatures could also tend to lead to self-condensation and possibly gelation. One skilled in the art would be able to choose the proper reactant amounts and conditions to reduce or eliminate gel formation.

The above process may be prepared in a one-step or multi-step process. In one embodiment of a multi-step process, the amino compounds are first reacted with the mono(alkylaldehyde) and/or poly(alkylaldehyde) compounds (alkylolation reaction), and then the etherification step would occur by the reaction with an alcohol. In another embodiment of a multi-step reaction, the amino compounds are first reacted with a poly(alkylaldehyde) followed by an etherification step, then reacted with a mono(alkylaldehyde) followed by another etherification step.

The alkylolation reaction is preferably conducted in the presence of a catalyst. An acid or base catalyst may be used.

It should be noted that the above organic acids of this invention that are utilized to stabilize the crosslinking compositions may be added to the reaction as a catalyst for both the alkylolation and etherification steps. In general, the amount of the organic acids needed as catalyst will be less than the amount needed to stabilize the crosslinking composition.

Non-limiting examples of base catalysts are inorganic basic salts such as the hydroxides, carbonates or bicarbonates of lithium, sodium, potassium, calcium and magnesium, or the organic bases and basic salts such as amines and guanidine, quaternary-ammonium or phosphonium hydroxide and (bi-)carbonate salts.

The etherification reaction is preferably conducted in the presence of an acid catalyst. The same acid catalyst described above for the alkylolation reaction may also be used in the etherification reaction.

The reaction is carried out at a temperature from about 0° C. to about 125° C., or about 25° C. to about 100° C. or about 50° C. to about 75° C. for a time of about 0.5 hours to about 48 hours, or about 1 hour to about 24 hours or about 1 hour to about 12 hours.

An important use of the compositions described herein is based on their ability to act as crosslinking agents in curable compositions, and especially those curable compositions which contain materials or polymers having active hydrogen groups. The crosslinkers of the present invention are capable of crosslinking active hydrogen containing materials or polymers.

The active hydrogen-containing material of the curable compositions preferably contains at least one class of a reactive functionality such as hydroxy, carboxy, amino, amido, carbamato, mercapto, or a blocked functionality which is convertible to any of the preceding reactive functionalities. These active hydrogen-containing materials are those which are conventionally used in amino resin coatings, and in general are considered well-known to those of ordinary skill in the relevant art.

Suitable active hydrogen-containing materials include, for example, polyfunctional hydroxy group containing materials such as polyols, hydroxyfunctional acrylic resins having pendant or terminal hydroxy functionalities, hydroxyfunctional polyester resins having pendant or terminal hydroxy functionalities, hydroxyfunctional polyurethane prepolymers, products derived from the condensation of epoxy compounds with an amine, and mixtures thereof. Acrylic and polyester resins are preferred. Examples of the polyfunctional hydroxy group containing materials include DURAMAC® 203-1385 alkyd resin (Eastman Chemical Co.); Beckosol® 12035 alkyd resin (Reichhold Chemical Co. Durham, N.C.) JONCRYL® 500 acrylic resin (S.C. Johnson & Sons, Racine, Wis.); AT-400 acrylic resin (Rohm & Haas, Philadelphia, Pa.); CYPLEX® polyester resin (Cytec Industries, West Paterson, N.J.); CARGILL® 3000 and 5776 polyester resins (Cargill, Minneapolis, Minn.); K-FLEX® XM-2302 and XM-2306 resins (King Industries, Norwalk, Conn.); CHEMPOL® 11-1369 resin (Cook Composites and Polymers (Port Washington, Wis.); CRYLCOAT® 3494 solid hydroxy terminated polyester resin (UCB CHEMICALS USA, Smyrna, Ga.); RUCOTE® 101 polyester resin (Ruco Polymer, Hicksville, N.Y.); JONCRYL® SCX-800-A and SCX-800-B hydroxyfunctional solid acrylic resins (S.C. Johnson & Sons, Racine, Wis.); and the like.

Examples of carboxyfunctional resins include CRYLCOAT® solid carboxy terminated polyester resin (UCB CHEMICALS USA, Smyrna, Ga.). Suitable resins containing amino, amido, carbamato or mercapto groups, including groups convertible thereto, are in general well-known to those of ordinary skill in the art and may be prepared by known methods including copolymerizing a suitably functionalized monomer with a comonomer capable of copolymerizing therewith.

The curable compositions may optionally further comprise a cure catalyst. The cure catalysts usable in the present invention include sulfonic acids, aryl, alkyl, and aralkyl sulfonic acids; aryl, alkyl and aralkyl acid phosphates; aryl, alkyl and aralkyl acid pyrophosphates; carboxylic acids; sulfonimides; mineral acids and a mixture thereof. Of the above acids, sulfonic acids are preferred when a catalyst is utilized. Examples of the sulfonic acids include benzenesulfonic acid, para-toluenesulfonic acid, dodecylbenzenesulfonic acid, naphthalenesulfonic acid, dinonylnaphthalenedisulfonic acid, and a mixture thereof. Examples of the aryl, alkyl and aralkyl phosphates and pyrophosphates include phenyl, para-tolyl, methyl, ethyl, benzyl, diphenyl, di-para-tolyl, di-methyl, di-ethyl, di-benzyl, phenyl-para-tolyl, methyl-ethyl, phenyl-benzyl phosphates and pyrophosphates. Examples of the carboxylic acids include benzoic acid, formic acid, acetic acid, propionic acid, butyric acid, dicarboxylic acids such as oxalic acid, fluorinated acids such as trifluoroacetic acid, and the like. Examples of the sulfonimides include dibenzene sulfonimide, di-para-toluene sulfonimide, methyl-para-toluene sulfonimide, dimethyl sulfonimide, and the like. Examples of the mineral acids include nitric acid, sulfuric acid, phosphoric acid, poly-phosphoric acid, and the like.

The curable composition may also contain other optional ingredients such as fillers, light stabilizers, pigments, flow control agents, plasticizers, mold release agents, corrosion inhibitors, and the like. It may also contain, as an optional ingredient, a medium such as a liquid medium to aid the uniform application and transport of the curable composition. Any or all of the ingredients of the curable composition may be contacted with the liquid medium. Moreover, the liquid medium may permit formation of a dispersion, emulsion, invert emulsion, or solution of the ingredients of the curable composition. Particularly preferred is a liquid medium, which is a solvent for the curable composition ingredients. Suitable solvents include aromatic hydrocarbons, aliphatic hydrocarbons, halogenated hydrocarbons, ketones, esters, ethers, amides, alcohols, water, compounds having a plurality of functional groups such as those having an ether and an ester group, and a mixture thereof.

Preferably, the weight ratio of the active hydrogen-containing material to the crosslinking composition is in the range of from about 99:1 to about 0.5:1 or about 10:1 to about 0.8:1 or about 4:1 to about 0.8:1.

The weight percent of the cure catalyst, if present, is in the range of from about 0.01 to about 3.0 wt % based on the weight of the crosslinker and activehydrogen-containing material components.

The present coating compositions may employ a liquid medium such as a solvent, or it may employ solid ingredients as in powder coatings, which typically contain no liquids. Contacting may be carried out by dipping, spraying, padding, brushing, rollercoating, flowcoating, curtaincoating, electrocoating or electrostatic spraying.

The liquid or powder coating compositions and a substrate to be coated are contacted by applying the curable composition onto the substrate by a suitable method, for example, by spraying in the case of the liquid compositions and by electrostatic spraying in the case of the powder compositions. In the case of powder coatings, the substrate covered with the powder composition is heated to at least the fusion temperature of the curable composition forcing it to melt and flow out and form a uniform coating on the substrate. It is thereafter fully cured by further application of heat, typically at a temperature in the range of about 120° C. to about 220° C. for a period of time in the in the range of about 5 minutes to about 30 minutes and preferably for a period of time in the range of 10 to 20 minutes.

In the case of the liquid compositions, the solvent is allowed to partially evaporate to produce a uniform coating on the substrate. Thereafter, the coated substrate is allowed to cure at temperatures of about 20° C. to about 150° C., or about 25° C. to about 120° C. for a period of time in the in the range of about 20 seconds to about 30 days depending on temperature to obtain a cured film. In a particularly advantageous embodiment, coating compositions formulated with crosslinker containing compositions of the present invention can be heat cured at lower temperatures preferably ranging from about 20° C. to about 90° C.

The heat cured compositions of this invention may be employed in the general areas of coatings such as original equipment manufacturing (OEM) including automotive coatings, general industrial coatings including industrial maintenance coatings, architectural coatings, powder coatings, coil coatings, can coatings, wood coatings, and low temperature cure automotive refinish coatings. They are usable as coatings for wire, appliances, automotive parts, furniture, pipes, machinery, and the like. Suitable surfaces include metals such as steel and aluminum, plastics, wood and glass.

The curable compositions of the present invention are particularly well suited to coat heat sensitive substrates such as plastics and wood which may be altered or destroyed entirely at the elevated cure temperatures prevalent in the heat curable compositions of the prior art.

The present invention will now be illustrated by the following examples. The examples are not intended to limit the scope of the present invention. In conjunction with the general and detailed descriptions above, the examples provide further understanding of the present invention.

EXAMPLES

Example 1

Preparation of Tris(propylol)melamine Methyl Ether (TPMM)

In a suitable flask was mixed 3026 grams of melamine (2.4 mole) with 1394 grams of propionaldehyde (24 moles), 1991 grams of methanol and 15.6 grams of acetic acid. The mixture was heated to 65° C., and kept for 2 hours. The solution cooled to precipitate solids, which were then separated by filtration. The solids had a melting point of about 152-154° C.

Examples 2 and 2C

Solubility of Tris(propylol)melamine Methyl Ether in Ethyl Acetate

The resin of Example 1 was placed in the following liquids

TABLE 1

| | Solubility compositions | |
|---|---|---|
| Ingredient | Example 2 | Example 2C |
| Resin of Example 1 | 1.2 g (3.5 mmol) | 1.2 g |
| Ethyl Acetate | 1.2 g | 2.4 g |
| Acetic Acid | 1.2 g (20 mmol) | — |

Both compositions were heated to 80° C. The resin in Example 2 dissolved and the composition became homogenous (clear) and remained homogenous upon cooling. The resin in Example 2C did not dissolve upon heating and the composition did not become homogenous (not clear—hazy).

Example 3

Solvent Resistance of Coatings Containing the Crosslinking Resins of Examples 2

A coating compositions containing the crosslinking composition of Examples 2 was prepared by mixing 36 parts crosslinking resin with 64 parts acrylic backbone resin (Joncryl® 500) on a dry weight basis and 1.0 parts dimethyl acid pyrophosphate catalyst in butanol. The formulation was applied on iron phosphate treated cold roll steel panels and baked at 105° C. for 20 minutes. Solvent resistance of the baked film was measured using a methylethyl ketone (MEK) rub. The result is shown in Table 2 below.

TABLE 2

| | | Solvent resistance | |
|---|---|---|---|
| Example | Resin Example | Film Thickness (mils) | MEK Rubs to Remove |
| 3 | 2 | 1.0 | 200+ |

Solvent Resistance is measured by methyl ethyl ketone (MEK) double rubs to remove the coating.

Example 3 demonstrates that a film with good solvent resistance may be formed by using an organic acid additive.

Examples 4 to 8 and 4C to 8C

Solubility of Tris(propylol)melamine Methyl Ether in Other Common Coating Solvents The TPMM resin of Example 1 was contacted with additional solvents to determine their solubility in common solvents used in the coating industry. The compositions and the results of the solubility tests are disclosed in Table 3 below.

TABLE 3

| | Solubility Compositions and results | | | | | | | |
|---|---|---|---|---|---|---|---|---|
| Example | 5 | 6 | 7 | 8 | 5C | 6C | 7C | 8C |
| TPMM of Example 1 | 1.22 g | 1.22 g | 1.22 g | 1.22 g | 1.22 g | 1.22 g | 1.22 g | 1.22 g |
| Glacial Acetic Acid | 0.32 g | 0.32 g | 0.32 g | 032 g | 0 g | 0 g | 0 g | 0 g |
| Solvent Heated to 80 C. | MEK 2.4 g Clear | Tol. 2.4 g Clear | MeOH 2.4 g Hazy | IPA 2.4 g Clear | MEK. 2.7 g Hazy | Tol. 2.7 g Hazy | MeOH 2.7 g Hazy | IPA 2.7 g Hazy |

TABLE 3-continued

Solubility Compositions and results

| Example | 5 | 6 | 7 | 8 | 5C | 6C | 7C | 8C |
|---|---|---|---|---|---|---|---|---|
| Cooled to ambient | Clear | Slight Haze | | Hazy | | | | |
| Additional solvent | | Tol. 2.7 g | | IPA 2.7 g | | | | |
| Heated to 80 C. | | Clear | | Hazy | | | | |

MEK—Methyl ethyl ketone
Tol.—Toluene
MeOH—Methanol
IPA—Isopropanol

The results show that without the glacial acetic acid, none of the solvents solubilized the TPMM resin. The use of glacial acetic acid allows the TPMM resin to be used as a crosslinker for coating applications.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A stabilized crosslinking composition consisting essentially of:

(I) a compound of Formula I:

$$A'\text{-}NR^A\text{---}R^D \quad \text{(Formula 1)}$$

in which A' is selected from: (a) a monovalent moiety of a compound selected from: linear ureas, cyclic ureas, cyanuric acid, substituted cyanuric acids, linear amides, cyclic amides, glycolurils, hydantoins, linear carbamates, cyclic carbamates and mixtures thereof, and (b) a moiety of Formula 2:

(Formula 2)

$R^A$ is selected from: $R^D$, hydrogen, $C_{1\text{-}20}$alkyl, and where $R^A$ taken together with A' forms a cyclic compound; $R^D$ is ←—$CHR^C OR^B$, where $R^B$ is selected from: hydrogen, $C_{1\text{-}24}$alkyl, $C_{3\text{-}24}$aryl, $C_{4\text{-}24}$aralkyl and $C_{4\text{-}24}$alkaryl; and $R^C$ is selected from: optionally halogenated $C_{1\text{-}24}$alkyl; $C_{3\text{-}24}$aryl, optionally halogenated $C_{4\text{-}24}$aralkyl; $C_{2\text{-}24}$alkoxyalkyl, and $C_{4\text{-}24}$alkaryl, and A is a monovalent moiety of a compound selected from: linear ureas, cyclic ureas, cyanuric acid, substituted cyanuric acids, linear amides, cyclic amides, glycolurils, hydantoins, linear carbamates, cyclic carbamates and mixtures thereof;

B is a divalent residue of a poly(alkylaldehyde) with n aldehyde groups;

n is an integer of from 2 to 8 (inclusive);

$R_a$ is selected from: $R_d$, hydrogen, $C_{1\text{-}20}$alkyl and where $R_a$ taken together with A forms a cyclic compound; and $R_b$ selected from: hydrogen, $C_{1\text{-}24}$alkyl, $C_{3\text{-}24}$aryl, $C_{4\text{-}24}$aralkyl and $C_{4\text{-}24}$alkaryl; where $R_d$ is selected from: a radical ←—$CHR_c OR_b$ and a moiety of Formula 3:

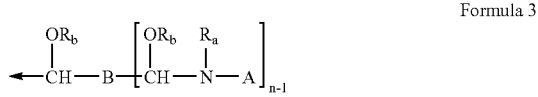

Formula 3

$R_c$ is selected from: optionally halogenated $C_{1\text{-}24}$alkyl; $C_{3\text{-}24}$aryl; optionally halogenated $C_{4\text{-}24}$aralkyl; $C_{2\text{-}24}$alkoxyalkyl; and $C_{4\text{-}24}$alkaryl;

and where, when A' is from a compound other than triazine, the alkyl and aryl groups in each radical may optionally have heteroatoms in their structure;

(II) a carboxylic acid group containing organic acid stabilizer in amount of from 1:50 to 50:1 moles of the amount of moles of (I) the compound of Formula 1; and (III) a solvent.

2. The crosslinking composition of claim 1, where the mole ratio of the carboxylic acid stabilizer (II) to the compound of Formula 1 (I) is from 1:20 to 20:1.

3. The crosslinking composition of claim 2, where the mole ratio of the carboxylic acid stabilizer (II) to the compound of Formula 1 (I) is from 1:10 to 10:1.

4. The crosslinking composition of claim 3, where the mole ratio of the carboxylic acid stabilizer (II) to the compound of Formula 1 (I) is from 1:5 to 4:1.

5. The crosslinking composition of claim 4, where the mole ratio of the carboxylic acid stabilizer (II) to the compound of Formula 1 (I) is from 1:2.5 to 2:1.

6. The crosslinking composition of claim 5, where the mole ratio of the carboxylic acid stabilizer (II) to the compound of Formula 1 (I) is from 1:2 to 1.5:1.

7. The crosslinking composition of claim 6, where the mole ratio of the carboxylic acid stabilizer (II) to the compound of Formula 1 (I) is 1:1.

8. The crosslinking composition of claim 1, where (I) A' is from a compound other than a triazine.

9. The crosslinking composition of claim 1, where (I) A' is other than a moiety of Formula 2.

10. The crosslinking composition of claim 1, where (II) the organic acid stabilizer is selected from: acetic acid, formic acid, propionic acid, butanoic acid, pentanoic acid, hexanoic acid, benzoic acid, phthalic acid, carbonic acid, oxalic acid, malonic acid, succinic acid, glutaric acid, adipic acid, malic acid, tartaric acid, citric acid, latic acid, glycolic acid, glyoxylic acid, and mixtures thereof.

11. The composition according of claim 10, where (II) the organic acid is selected from: acetic acid, formic acid, propionic acid and mixtures thereof.

12. The crosslinking composition of claim 10, where (II) the organic acid stabilizer is selected from: glacial acetic acid, monohalogenated acetic acids and polyhalogenated acetic acids.

13. The crosslinking composition of claim 1, where (I) the compound of Formula 1 is selected from: compounds where $R^D$ is $\leftarrow$—$CHR^COR^B$ and compounds where A' is Formula 2; and where $R_b$ (where present) and $R^B$ are independently derived from alcohols selected from: methanol, ethanol, propanol, isopropanol, butanol, isobutanol, cyclohexanol, phenol, benzyl alcohol, monoalkyl ether of ethylene, monoalkyl ether of propylene glycol and mixtures thereof.

14. The crosslinking composition of claim 1, where (I) A' is Formula 2 and

B is from compounds selected from: glutaraldehyde, the reaction products of crotonaldehyde and polyhydritic alcohols, adducts of α,β-unsaturated aldehydes; and polymers of α,β-unsaturated aldehydes.

15. The crosslinking composition of claim 1, where (I) the compound of Formula 1 is selected from: compounds where $R^D$ is $\leftarrow$—$CHR^COR^B$ and compounds where A' is Formula 2; and where $R_c$ (where present) and $R^C$ are independently $C_{1-8}$alkyl; and $R_b$ (where present) and $R^B$ are independently selected from:

$C_{1-8}$alkyl and $C_{1-8}$alkoxyalkyl.

16. The crosslinking composition of claim 1, where (I) A' is from a compound selected from: melamines, guanamines, linear ureas, cyclic ureas and mixtures thereof.

17. A process for producing the crosslinking composition of claim 1, comprising the steps of:

(A) producing a compound of Formula 1, by reacting
  (i) an amino group containing a compound selected from: linear ureas, cyclic ureas, cyanuric acid, substituted cyanuric acids, linear amides, cyclic amides, glycolurils, hydantoins, linear carbamates, cyclic carbamates and mixtures thereof;
  (ii) an aldehyde selected from: a mono(alkylaldehyde), a poly(alkylaldehyde) and mixtures thereof; and
  (iii) an alcohol; and
(B) adding an organic acid comprising a carboxylic acid group where the molar ratio of the organic acid (B) to the amino compound (A)(i) is from 1:50 to 50:1;
with the proviso that where A' is other than Formula 2, the aldehyde (A)(ii) is a mono (alkylaldehyde).

18. The process of claim 17, where the mole ratio of the carboxylic acid stabilizer (B) to the amino compound (A)(i) is from 1:20 to 20:1.

19. The process of claim 18, where the mole ratio of the carboxylic acid stabilizer (B) to the amino compound (A)(i) is from 1:10 to 10:1.

20. The process of claim 19, where the mole ratio of the carboxylic acid stabilizer (B) to the amino compound (A)(i) is from 1:5 to 4:1.

21. The process of claim 20, where the mole ratio of the carboxylic acid stabilizer (B) to the amino compound (A)(i) is from 1:2.5 to 2:1.

22. The process of claim 21, where the mole ratio of the carboxylic acid stabilizer (B) to the amino compound (A)(i) is from 1:2 to 1.5:1.

23. The process of claim 22, where the mole ratio of the carboxylic acid stabilizer (B) to the amino compound (A)(i) is 1:1.

24. The process of claim 17, where A' is a moiety from a triazine and the aldehyde (A)(ii) is a mono (alkylaldehyde).

25. The process of claim 17, wherein at least some of the organic acid (B) is added before or during the reaction (A).

26. The process of claim 17, wherein at least some of the organic acid (B) is added after the reaction (A).

27. The process of claim 17, where the amino compound (A)(i) is selected from: melamine, guanamine, linear urea, cyclic urea and mixtures thereof.

28. The process of claim 17, where the mono(alkylaldehyde) (A)(ii) is selected from: acetaldehyde, propionaldehyde, n-butyraldehyde, isobutyraldehyde, valeraldehyde, chloral, caproaldehyde, octylaldehyde, acrolein and crotonaldehyde.

29. The process of claim 17, wherein the poly(alkylaldehyde) (A)(ii) is selected from: glutaraldehyde, the reaction product of crotonaldehyde and polyhydritic alcohols; adducts of α,β-unsaturated aldehydes and polymers of α,β-unsaturated aldehydes.

30. The process of claim 17, where the alcohol (A)(iii) is selected from: methanol, ethanol, propanol, isopropanol, butanol, isobutanol, cyclohexanol, phenol, benzyl alcohol, monoalkyl ether of ethylene, monoalkyl ether of propylene glycol and mixtures thereof.

31. The process of claim 17, where the organic acid (B) is selected from: acetic acid, formic acid, propionic acid and mixtures thereof.

32. The process of claim 17, where A' is Formula 2; and:
  the molar ratio of the amino group (A)(i) to the mono (alkylaldehyde) (A)(ii) is 1:0.1 to 1:30,
  the molar ratio of amino group (A)(i) to the aldehyde groups in the poly(alkylaldehyde) (A)(ii) is 0.1:1 to 50:1; and
  the molar ratio of aldehyde groups in the mono(alkylaldehyde) (A)(ii) and the poly(alkylaldehyde) (A)(ii) to the alcohol (A)(iii) is 1:0.2 to 1:50.

33. The process of claim 17, where A' is other than Formula 2; and:
  the molar ratio of the amino group (A)(i) to the mono (alkylaldehyde) (A)(ii) is 1:0.1 to 1:30, and
  the molar ratio of aldehyde groups in the mono(alkylaldehyde) (A)(ii) to the alcohol (A)(iii) is 1:0.2 to 1:50.

* * * * *